US010222783B2

(12) United States Patent
Matsubara et al.

(10) Patent No.: US 10,222,783 B2
(45) Date of Patent: Mar. 5, 2019

(54) NUMERICAL CONTROL DEVICE, NC MACHINING DEVICE, AND NC MACHINING METHOD

(71) Applicant: Mitsubishi Electric Corporation, Tokyo (JP)

(72) Inventors: Susumu Matsubara, Tokyo (JP); Hiroki Kaneko, Tokyo (JP); Kenji Iriguchi, Tokyo (JP); Naoki Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 14 days.

(21) Appl. No.: 15/508,407

(22) PCT Filed: Oct. 29, 2014

(86) PCT No.: PCT/JP2014/078831
§ 371 (c)(1),
(2) Date: Mar. 2, 2017

(87) PCT Pub. No.: WO2016/067401
PCT Pub. Date: May 6, 2016

(65) Prior Publication Data
US 2017/0308060 A1 Oct. 26, 2017

(51) Int. Cl.
*G05B 19/4068* (2006.01)
*G05B 19/402* (2006.01)
*G05B 19/4097* (2006.01)

(52) U.S. Cl.
CPC ....... *G05B 19/4068* (2013.01); *G05B 19/402* (2013.01); *G05B 19/4097* (2013.01);
(Continued)

(58) Field of Classification Search
CPC .............. G05B 19/4069; G05B 19/409; G05B 19/4093; G05B 19/40937; G05B 19/4097; G06F 17/30259; G06F 17/50
See application file for complete search history.

(56) References Cited

U.S. PATENT DOCUMENTS

| 4,519,026 A * | 5/1985 | Nozawa ............... G05B 19/409 318/562 |
| 5,134,570 A | 7/1992 | Nankaku |

(Continued)

FOREIGN PATENT DOCUMENTS

| CN | 102473008 A | 5/2012 |
| JP | 02-007105 A | 1/1990 |

(Continued)

OTHER PUBLICATIONS

Notice of Reasons for Refusal of Japanese Application No. 2015-539319 dated Nov. 4, 2015.
(Continued)

*Primary Examiner* — Crystal J Barnes-Bullock
(74) *Attorney, Agent, or Firm* — Sughrue Mion, PLLC; Richard C. Turner

(57) ABSTRACT

A numerical control device includes an NC-machining-program reading unit to read an NC machining program, a machining-removal-shape generation unit to generate a machining removal shape by a block of the NC machining program, a tool-data search unit to search for tool data to be used in the NC machining program, and a machining-finished-shape generation unit to generate a machining finished shape from the machining removal shape generated by the machining-removal-shape generation unit. During editing of the NC machining program, the machining removal shape and the machining finished shape can be confirmed sequentially by the block.

19 Claims, 10 Drawing Sheets

(52) U.S. Cl.
CPC .............. *G05B 2219/35012* (2013.01); *G05B 2219/36252* (2013.01)

(56) References Cited

U.S. PATENT DOCUMENTS

| | | | | |
|---|---|---|---|---|
| 5,471,394 | A * | 11/1995 | Matsumura | ........ G05B 19/4069 700/180 |
| 5,561,601 | A | 10/1996 | Inoue et al. | |
| 6,266,572 | B1 * | 7/2001 | Yamazaki | ........... G05B 19/4069 700/159 |
| 7,577,492 | B2 * | 8/2009 | Kamiya | ............. G05B 19/4093 700/182 |
| 7,933,677 | B2 * | 4/2011 | Lankalapalli | ........ G05B 19/409 700/172 |
| 8,723,862 | B2 * | 5/2014 | Mitani | .................... G06F 17/50 345/419 |
| 9,547,301 | B2 * | 1/2017 | Seya | .................. G05B 19/4063 |
| 9,811,759 | B2 * | 11/2017 | Matsubara | ........... G06K 9/6202 |
| 9,821,394 | B2 * | 11/2017 | Hasegawa | ................ B23H 1/02 |
| 2002/0031019 | A1 | 3/2002 | Nakamura | |
| 2002/0045968 | A1 | 4/2002 | Nakamura | |
| 2010/0298967 | A1 | 11/2010 | Frisken et al. | |
| 2011/0245954 | A1 | 10/2011 | Sullivan et al. | |
| 2012/0089242 | A1 | 4/2012 | Iriguchi et al. | |
| 2013/0116983 | A1 | 5/2013 | Montana et al. | |
| 2013/0116990 | A1 | 5/2013 | Montana et al. | |
| 2014/0163711 | A1 * | 6/2014 | Matsubara | ................ G06K 9/00 700/103 |
| 2014/0172151 | A1 | 6/2014 | Niwa et al. | |
| 2016/0011583 | A1 * | 1/2016 | Matsubara | ......... G05B 19/4093 700/181 |

FOREIGN PATENT DOCUMENTS

| | | |
|---|---|---|
| JP | 02-012403 A | 1/1990 |
| JP | 05-100730 A | 4/1993 |
| JP | 06-155245 A | 6/1994 |
| JP | 07-175507 A | 7/1995 |
| JP | 07-311612 A | 11/1995 |
| JP | 11-009818 A | 1/1999 |
| JP | 11-065633 A | 3/1999 |
| JP | 11-296214 A | 10/1999 |
| JP | 2000-235407 A | 8/2000 |
| JP | 2001-142515 A | 5/2001 |
| JP | 2004-234696 A | 8/2004 |
| JP | 2005-056307 A | 3/2005 |
| JP | 2008-140358 A | 6/2008 |
| JP | 2008-246620 A | 10/2008 |
| JP | 4329248 B2 | 9/2009 |
| JP | 4343072 B2 | 10/2009 |
| JP | 4390093 B2 | 12/2009 |
| JP | 2010-027018 A | 2/2010 |
| JP | 2010-277585 A | 12/2010 |
| JP | 2013-097812 A | 5/2013 |
| JP | 2013-097813 A | 5/2013 |
| JP | 2013-517535 A | 5/2013 |
| WO | 2014/097371 A1 | 6/2014 |

OTHER PUBLICATIONS

International Search Report of PCT/JP2014/078831 dated Feb. 3, 2015 [PCT/ISA/210].

Communication dated Feb. 6, 2018 issued by the State Intellectual Property Office of People's Republic of China in counterpart Chinese application No. 201480083064.0.

Communication dated Sep. 4, 2018 from the State Intellectual Property Office of People's Republic of China in counterpart application No. 201480083064.0.

* cited by examiner

NUMERICAL CONTROL DEVICE, NC MACHINING DEVICE, AND NC MACHINING METHOD

CROSS REFERENCE TO RELATED APPLICATIONS

This application is a National Stage of International Application No. PCT/JP2014/078831, filed Oct. 29, 2014, the contents of which are incorporated herein by reference in its entirety.

FIELD

The present invention relates to a numerical control device that numerically controls a machine tool, and relates to an NC machining device and an NC machining method that use the numerical control device.

BACKGROUND

Conventionally, in order to perform machining with a common numerical control device, a numerical-control machining program in which a movement command for moving a workpiece or a machining tool along a preset path is described is used. The numerical-control machining program is hereinafter referred to as "NC (Numerical Control) machining program". The NC machining program is created by, for example, commercially-available CAM (Computer Aided Manufacturing) software. The NC machining program is described with, for example, a G-code and a macro character string, which are defined according to the format defined in EIA (Electronic Industries Alliance), or the format defined in ISO (International Standard Organization). In the following descriptions, the format defined in EIA is referred to as "EIA format", and the format defined in ISO is referred to as "ISO format". The G-code is a command code described in an NC machining program to execute a command for positioning, linear interpolation, circular interpolation, plane designation, and the like.

The created NC machining program needs to be confirmed in advance before the actual operation. However, it is difficult to confirm the NC machining program by viewing the NC machining program only. Therefore, when an NC machining program is confirmed, a movement command described in the NC machining program is converted to a tool path, and the converted tool path is displayed on a display device, for example. The display device to be used is a CRT (Cathode Ray Tube) device, or a display of the liquid-crystal monitor.

Further, the swept shape of a tool, obtained when the tool moves along the NC machining path, is generated, and the generated shape is removed from the material shape to generate a machining finished shape. The generated machining finished shape is then displayed on a display device such as a CRT device or a display of the liquid-crystal monitor.

In view of the background as described above, Patent Literature 1 discloses a technique of representing a highly-precise model that shows the swept volume of a tool, to improve the space and time efficiency for rendering.

Further, Patent Literature 2 discloses a technique of saving the results of a cutting work as a non-manifold data structure in order that an operator finds an optimum cutting-work procedure through interactive processing. The disclosed technique not only facilitates calculation of a total volume of the actual space during the cutting work, and display of the partially-finished shape, but also, even when the cutting-work procedure is changed to perform the cutting simulation, provides an optimum cutting procedure quickly and easily. In this technique, without performing geometric set operations again, an operator who quickly provides the results of the cutting simulation in correspondence to the changed cutting-work procedure performs logical operations through interactive processing to achieve a smaller amount of calculation.

Furthermore, Patent Literature 3 discloses a technique of simulating a cutting process by using a processing device and a hardware three-dimensional graphics display unit, in order to visualize the shape of a machined workpiece. In this technique, the problems with machining, such as excessively cutting into a die, or insufficiently cutting into a die, can be detected and confirmed before the actual machining. This can reduce time and effort required for the machining.

CITATION LIST

Patent Literatures

Patent literature 1: Japanese Patent Application Laid-open No. 2010-277585

Patent literature 2: Japanese Patent Application Laid-open No. H07-175507

Patent literature 3: Japanese Patent Application Laid-open No. 2000-235407

SUMMARY

Technical Problem

In the conventional simulation device and simulation method, an NC device generates an NC machining path. Therefore, it is necessary for the NC device to first read an NC machining program, and then generate an NC machining path sequentially from the beginning of the NC machining program. Accordingly, in order to confirm whether the edits in the NC machining program are correct through the simulation, it is necessary to generate an NC machining path sequentially from the beginning of the NC machining program.

According to the techniques in Patent Literatures 1 to 3, there is no method for searching for each line of the NC machining program, each line being referred to as "block" of the NC machining program and corresponding to each machining section of the machining finished shape. For this reason, editing of the NC machining program is not performed efficiently, and thus requires a considerable amount of time. Accordingly, there has been a need to achieve the efficient editing of the NC machining program.

The present invention has been achieved to solve the above problems, and an object of the present invention is to provide a numerical control device that can perform editing of an NC machining program easily and efficiently.

Solution to Problem

To solve the above problem and achieve the object, the present invention provides a numerical control device comprising: an NC-machining-program reading unit to read an NC machining program; a machining-removal-shape generation unit to generate a machining removal shape by a block of the NC machining program; a tool-data search unit to search for tool data to be used in the NC machining program; a machining-finished-shape generation unit to generate a machining finished shape from the machining removal shape generated by the machining-removal-shape generation unit; and a machining-removal-shape storage unit to store therein the machining removal shape.

Advantageous Effects of Invention

According to the present invention, editing of an NC machining program can be performed easily and efficiently.

DESCRIPTION OF EMBODIMENTS

Exemplary embodiments of a numerical control device, an NC machining device, and an NC machining method will be described below in detail with reference to the accompanying drawings. The present invention is not limited by the embodiments.

First Embodiment

Figure 1:
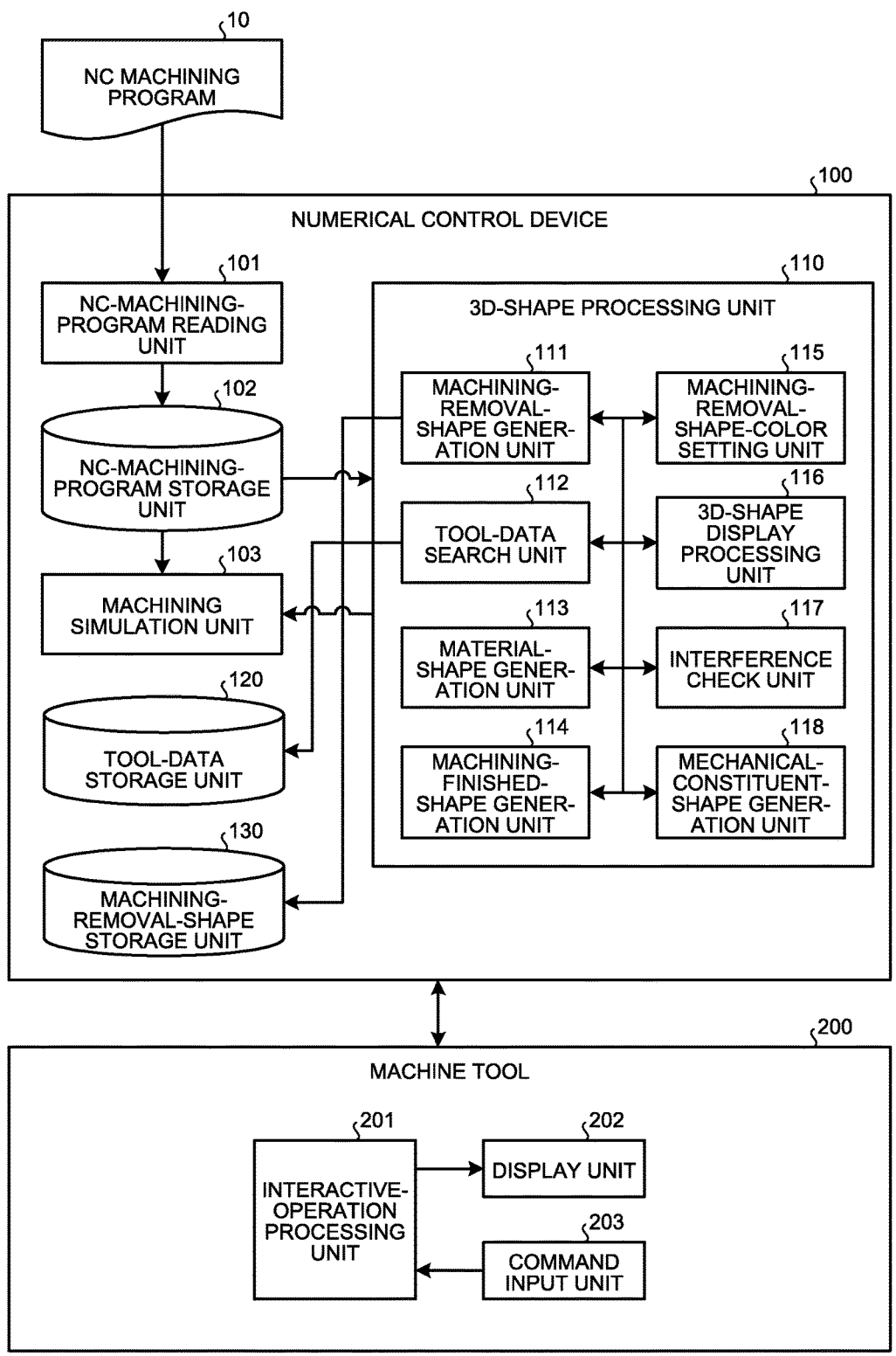
FIG. 1 is a functional block diagram of an NC machining apparatus for performing NC machining by using a numerical control device according to a first embodiment.

FIG. 1 is a functional block diagram of an NC machining apparatus for performing NC machining by using a numerical control device according to a first embodiment of the present invention to control a machine tool. The NC machining apparatus in the first embodiment is characterized by performing 3D-shape processing on an NC machining program 10 on a block-by-block basis. This NC machining apparatus is configured by a numerical control device 100, and a machine tool 200 controlled by the numerical control device 100. As illustrated in FIG. 1, the numerical control device 100 according to the present embodiment is configured to include an NC-machining-program reading unit 101 to read the NC machining program 10, an NC-machining-program storage unit 102 to store therein the read NC machining program, a machining simulation unit 103 to perform machining simulation on the basis of the NC machining program 10, a 3D-shape processing unit 110 to perform 3D-shape processing by the block of the NC machining program, a tool-data storage unit 120 to store therein tool data, and a machining-removal-shape storage unit 130 to store therein a machining removal shape generated by the 3D-shape processing unit 110. The term "block" as used herein indicates a single line of the NC program.

The 3D-shape processing unit 110 is configured by a machining-removal-shape generation unit 111 to generate a machining removal shape through machining simulation by the block of the NC machining program, a tool-data search unit 112 to search for tool data to be used in the NC machining program, from the tool-data storage unit 120, a material-shape generation unit 113 to generate a material shape from material data, a machining-finished-shape generation unit 114 to generate a machining finished shape from the machining removal shape generated by the machining-removal-shape generation unit 111, a machining-removal-shape-color setting unit 115 to set a color of the machining removal shape on the basis of the data generated by the machining-removal-shape generation unit 111, a 3D-shape display processing unit 116, an interference check unit 117 to check interference between the material shape and the machining removal shape, and a mechanical-constituent-shape generation unit 118 to generate a shape of a mechanical constituent to be used for machining, such as a chuck and a table.

The machine tool 200 according to the present embodiment is configured to include an interactive-operation processing unit 201 for an operator, that is, a worker to find an optimum cutting procedure through interactive processing, a display unit 202 to display an operation status, and a command input unit 203 to receive an input of an operation command.

Next, the numerical control device 100 according to the present embodiment, and the operation of the numerical control device 100 are described in relation to each unit illustrated in FIG. 1.

The NC-machining-program reading unit 101 reads the NC machining program 10, and stores the read program 10 in the NC-machining-program storage unit 102. As described under the section of "Background", the NC machining program 10 is a program that is created by, for example, commercially-available CAM software, and is described in, for example, a G-code and a macro character string which are defined according to the EIA format or the ISO format. In this program, for example, a movement command for moving a workpiece or a machining tool along a preset path, an auxiliary-operation command for a machine tool, and set values of machining conditions are described. Although the present embodiment gives an explanation of a program described in a G-code, it is also possible to select an appropriate program description method.

The material-shape generation unit 113 of the 3D-shape processing unit 110 generates a material shape from the NC machining program stored in the NC-machining-program storage unit 102. The tool-data search unit 112 of the 3D-shape processing unit 110 searches for tool data to be used in the NC machining program from the tool data stored in the tool-data storage unit 120. The machining-removal-shape generation unit 111 of the 3D-shape processing unit 110 generates a machining removal shape by each block of the NC machining program in accordance with the tool to be used, from the NC machining program and the tool data searched by the tool-data search unit 112. The generated machining removal shape is stored in the machining-removal-shape storage unit 130.

The machining-finished-shape generation unit 114 of the 3D-shape processing unit 110 generates a machining finished shape by removing the machining removal shape, generated by the machining-removal-shape generation unit 111, from the material shape generated by the material-shape generation unit 113.

The machining-removal-shape-color setting unit 115 of the 3D-shape processing unit 110 sets a machining-removal-shape color of the machining removal shape generated by the machining-removal-shape generation unit 111. The machining-finished-shape generation unit 114 adds the color set by the machining-removal-shape-color setting unit 115, to the surface of the machining finished shape defined by the machining removal shape when the machining removal shape having the machining removal shape color set is removed from the material shape generated by the material-shape generation unit 113. The display unit 202 displays the machining finished shape and the machining removal shape in colors according to the color information on the surface.

The machining simulation unit 103 performs machining simulation by receiving as a partially-machined shape an input of the machining finished shape generated by the machining-finished-shape generation unit 114 of the 3D-shape processing unit 110, then generating a tool swept shape on a servo-interpolation command basis from the NC machining program stored in the NC-machining-program storage unit 102, and removing the tool swept shape from the input partially-machined shape. The servo-interpolation command is a position command per servo cycle. The NC device generates a position command per servo cycle for a servo device on each axis of the machine tool, thereby controlling behavior of the machine tool.

The 3D-shape processing unit 110 performs interference check between the machining removal shape of a non-cutting command such as a positioning command G00, which is generated by the machining-removal-shape generation unit 111, and the material shape generated by the material-shape generation unit 113, or performs interference check between the machining removal shape and the shape of a mechanical constituent such as a chuck and a table, which is generated by the mechanical-constituent-shape generation unit 118.

The shape generated by the 3D-shape processing unit 110 is transmitted to the machine tool 200, and displayed on the display unit 202 of the machine tool 200.

The interactive-operation processing unit 201 is an interface processing unit between a worker and the machine tool 200, and between the numerical control device 100 and the machine tool 200. For example, the interactive-operation processing unit 201 can receive the operation processing from the numerical control device 100, and display this operation processing on the display unit 202. Further, the interactive-operation processing unit 201 can transmit to the numerical control device 100 command information input by a worker through the command input unit 203.

Figure 2:
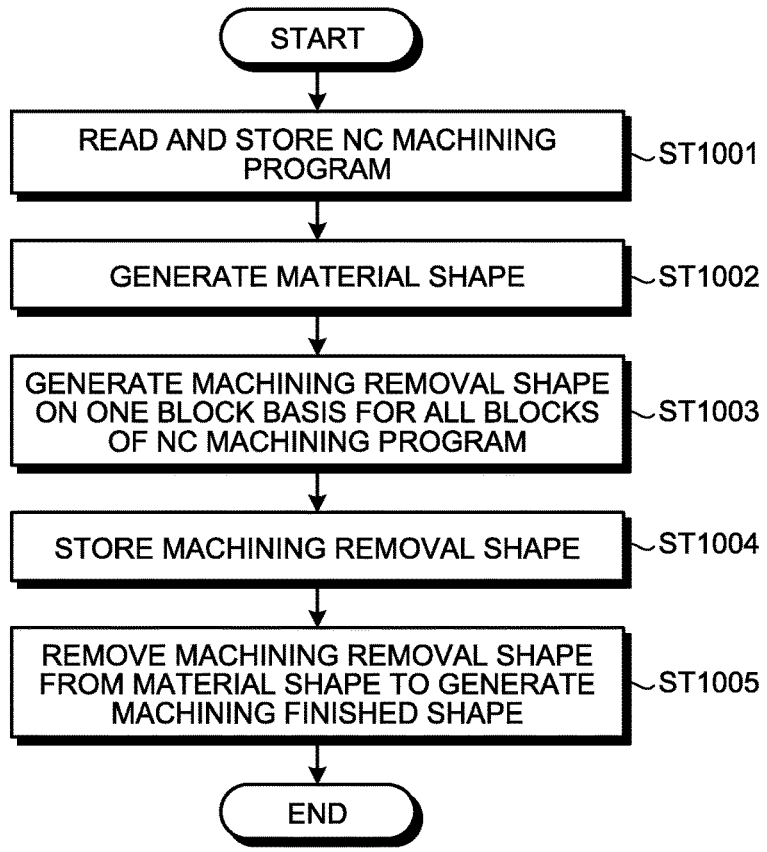
FIG. 2 is a flowchart illustrating a process in the numerical control device according to the first embodiment.

FIG. 2 is a flowchart illustrating the process in the numerical control device 100 according to the present embodiment. The process is described below in correspondence to the functional blocks illustrated in FIG. 1.

First, at Step ST1001, the NC-machining-program reading unit 101 reads the NC machining program 10, and stores the read program 10 in the NC-machining-program storage unit 102.

Next, at Step ST1002, the material-shape generation unit 113 generates a material shape from the NC machining program stored in the NC-machining-program storage unit 102. At this time, the material-shape generation unit 113 generates a cuboid shape and a cylindrical shape so as to include the entire command path of the NC machining program. The material shape may be generated with the kind and dimensions of the shape such as a cuboid shape and a cylindrical shape set in the NC machining program as setting information on the material shape. Further, the material shape may be generated in accordance with the kind and dimensions of the shape set by a worker through the interactive-operation processing unit 201 of the machine tool 200. Furthermore, the shape created in advance by a CAD or the like may be read to provide the material shape.

Next, at Step ST1003, the machining-removal-shape generation unit 111 reads all blocks of the NC machining program stored in the NC-machining-program storage unit 102, and generates a machining removal shape on one block basis.

Subsequently, at Step ST1004, the machining-removal-shape generation unit 111 stores the generated machining removal shape in the machining-removal-shape storage unit 130.

Next, at Step ST1005, the machining-finished-shape generation unit 114 removes the machining removal shape generated by the machining-removal-shape generation unit 111 from the material shape generated by the material-shape generation unit 113, to generate a machining finished shape.

Figure 3:
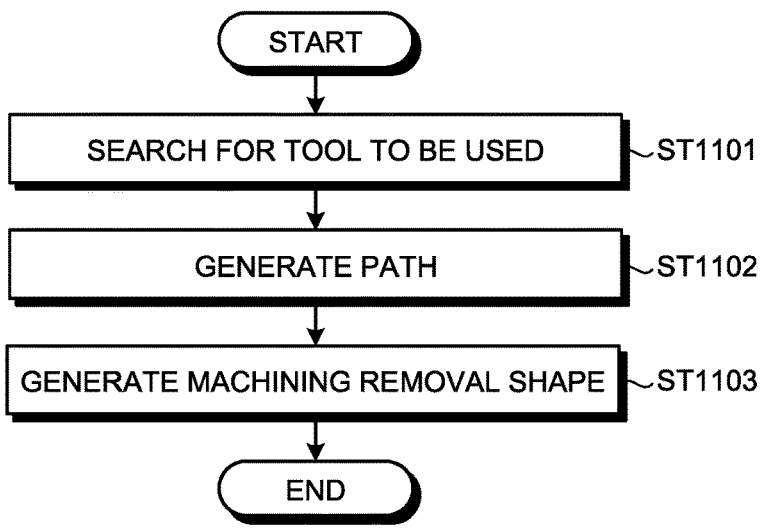
FIG. 3 is a flowchart illustrating a process for generating a machining removal shape of an NC-machining-program block in the numerical control device according to the first embodiment.

A description is made as to the respective steps performed in Step ST1003 that is a step of generating a machining removal shape on one block basis in the process illustrated in FIG. 2. FIG. 3 is a flowchart illustrating the process for generating a machining removal shape from the NC-machining-program block in the numerical control device.

First, at Step ST1101, the machining-removal-shape generation unit 111 searches for a tool to be used. In practice, in the case of the NC-machining-program block made up of a positioning command G00, and a movement command such as a linear-interpolation command G01 or a circular-interpolation command G02, the tool-data search unit 112 extracts the tool number designated by a tool-replacement command, and searches for tool data on the tool to be used corresponding to the extracted tool number, from the tool-data storage unit 120.

Next, at Step ST1102, the machining-removal-shape generation unit 111 generates a tool path from the movement command and the position command in the NC-machining-program block. In the case of the positioning command G00, for example, the tool path is a straight path from a command position G1 of the previous-block position command to a command position G2 of the current-block position command, like the machining removal shape of FIG. 4 generated through this process. In the case of the linear-interpolation command G01, when the shape of the tool to be used is denoted by reference character T, the tool path is a straight path $L_{12}$ from the command position G1 of the previous-block position command to the command position G2 of the current-block position command. Further, in the case of the circular-interpolation command G02, although not illustrated in FIG. 4, the tool path is a circular path from the command position G1 of the previous-block position command to the command position G2 of the current-block position command.

Next, at Step ST1103, the machining-removal-shape generation unit 111 generates a tool shape from the tool data searched at Step ST1101, and generates, as a machining removal shape, a shape obtained by sweeping the tool shape along the path generated at Step ST1102.

Figure 4:
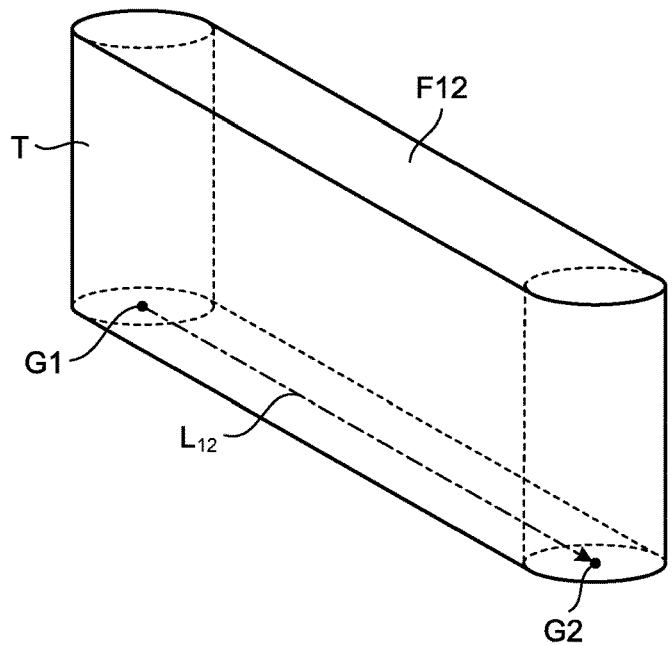
FIG. 4 is a diagram illustrating an example of a machining removal shape in NC machining using the numerical control device according to the first embodiment.

FIG. 4 illustrates a machining removal shape F12 generated through the process in FIG. 3. The machining removal shape F12 is generated by sweeping the tool shape T along the straight line $L_{12}$ from the command position G1 of the previous-block position command to the command position G2 of the current-block position command. In this manner, the machining removal shape provided by a straight groove part is generated.

The numerical control device according to the present embodiment generates a machining finished shape by the block, from the NC machining program. Therefore, the numerical control device can generate the machining finished shape in a smaller amount of calculation than the machining simulation according to a servo-interpolation command, and thus can accordingly generate the machining finished shape in a shorter time.

In the present embodiment, the machining removal shape and the machining finished shape are generated by the block, from the NC machining program, and the machining finished shape can be confirmed by the block in editing the NC machining program. Accordingly, confirmation of the NC machining program can be made easy and efficient.

Second Embodiment

Figure 5:
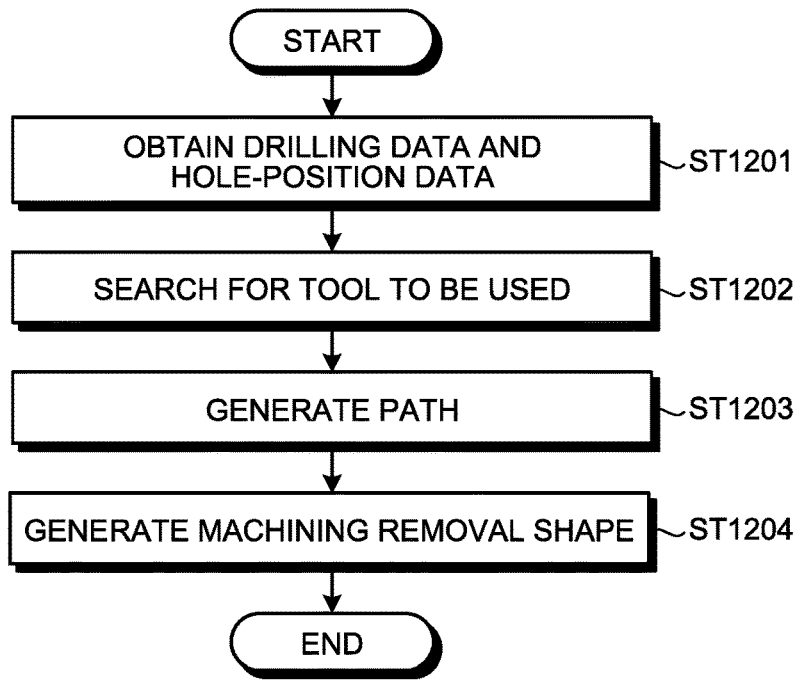
FIG. 5 is a flowchart illustrating a process for generating a machining removal shape of an NC-machining-program block of a fixed drilling cycle according to a second embodiment.

Next, a method of generating a machining removal shape of the NC-machining-program block of a fixed drilling cycle is described as a second embodiment. The NC machining device illustrated in FIG. 1 in the first embodiment is used as an NC machining device in the present embodiment. FIG. 5 is a flowchart illustrating the process for generating a machining removal shape of the NC-machining-program block of a fixed drilling cycle according to the second embodiment. The process is described below.

In the present embodiment, the NC machining device executes the fixed drilling cycle in which a machining program for positioning and drilling, boring, tapping, or the like is executed according to a predetermined coordinate sequence by a single-block command. The NC-machining-program reading unit 101 reads the NC-machining-program block of the fixed drilling cycle from the NC machining program 10, and stores the read program block in the NC-machining-program storage unit 102. In the present embodiment, a description is made as to the case where the NC-machining-program block is a fixed drilling cycle in which a machining program for positioning and drilling, boring, tapping, or the like is executed according to a predetermined coordinate sequence by a single-block command.

At Step ST1201, the machining-removal-shape generation unit 111 acquires drilling data and hole-position data of the NC-machining-program block.

Next, at Step ST1202, the machining-removal-shape generation unit 111 searches for a tool to be used. In practice, following a tool-replacement command prior to the current block, the tool-data search unit 112 searches for a tool to be used, from the tool data designated by this tool-replacement command.

Next, at Step ST1203, the machining-removal-shape generation unit 111 generates a path from the hole-position data and the drilling data that have been acquired at Step ST1201.

Subsequently, at Step ST1204, the machining-removal-shape generation unit 111 generates a drilling tool shape from the tool data searched at Step ST1202, and generates a machining removal shape that is a shape obtained by sweeping the tool shape along the path generated at Step ST1203.

Figure 6:
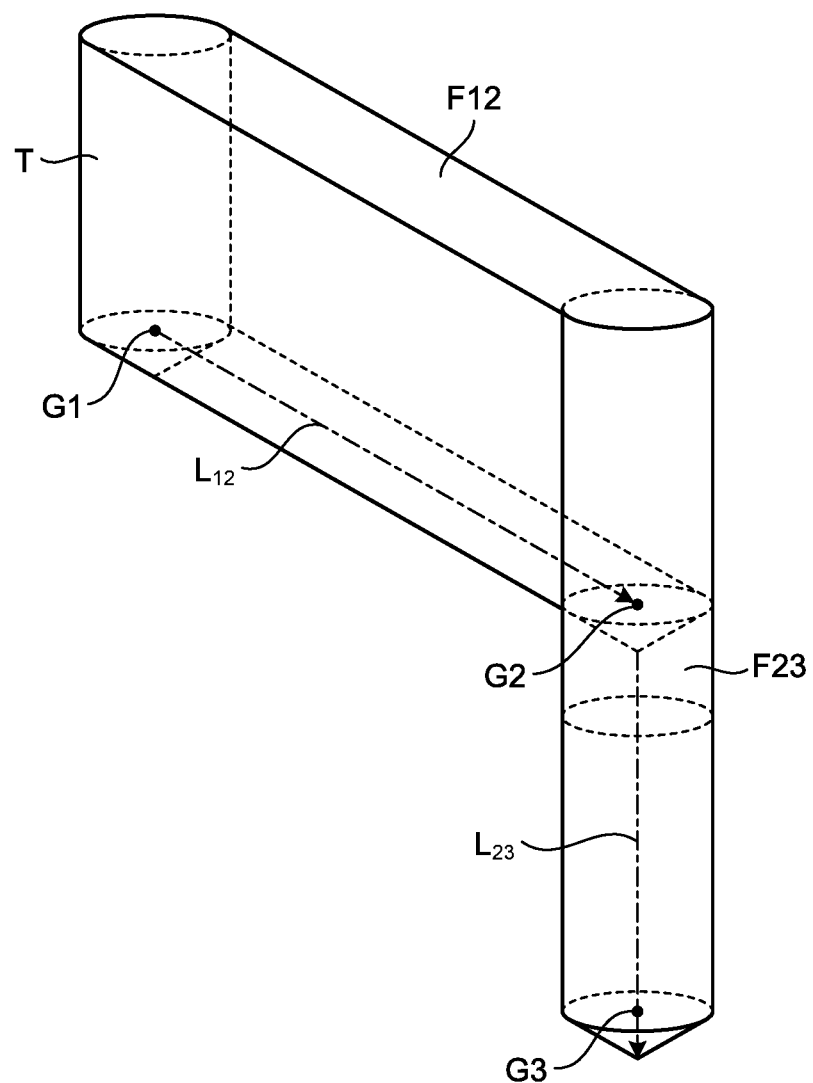
FIG. 6 is a diagram illustrating a machining removal shape of a NC-machining-program block of a fixed drilling cycle, which is generated through the process in a machining method according to the second embodiment.

FIG. 6 is a diagram illustrating the machining removal shape of the fixed drilling cycle, which is generated through the process in the machining method according to the second embodiment. The NC-machining-program block made up of the fixed drilling cycle generates the machining removal shape by generating a path from the drilling data and the hole-position data, and then sweeping, along the path, the tool shape T to be used. In the case of the positioning command G00, the path is the straight path $L_{12}$ from the command position G1 of the previous-block position command to the command position G2 of the current-block position command. In the case of the linear-interpolation command G01, the path is the straight path $L_{12}$ from the command position G1 of the previous-block position command to the command position G2 of the current-block position command. The subsequent movement to a command position G3 of the position command in a direction perpendicular to the straight line $L_{12}$ in accordance with the linear-interpolation command G01 provides a straight path $L_{23}$. This generates a machining removal shape made up of the machining removal shape F12 and a machining removal shape F23 that are a straight groove and a hole, respectively.

Also in the present embodiment, the machining removal shape and the machining finished shape are generated by the block, from the NC machining program, and the machining finished shape can be confirmed by the block in editing the NC machining program. Accordingly, on the basis of the simulation result obtained at the machining-simulation step and the target machining finished shape, confirmation of the NC machining program to edit the NC machining program by the block can be made easy and efficient.

Third Embodiment

Next, a method of generating a machining removal shape of the NC-machining-program block of a fixed turning cycle is described as a third embodiment. The NC machining device illustrated in FIG. 1 in the first embodiment is used as an NC machining device in the present embodiment.

Figure 7:
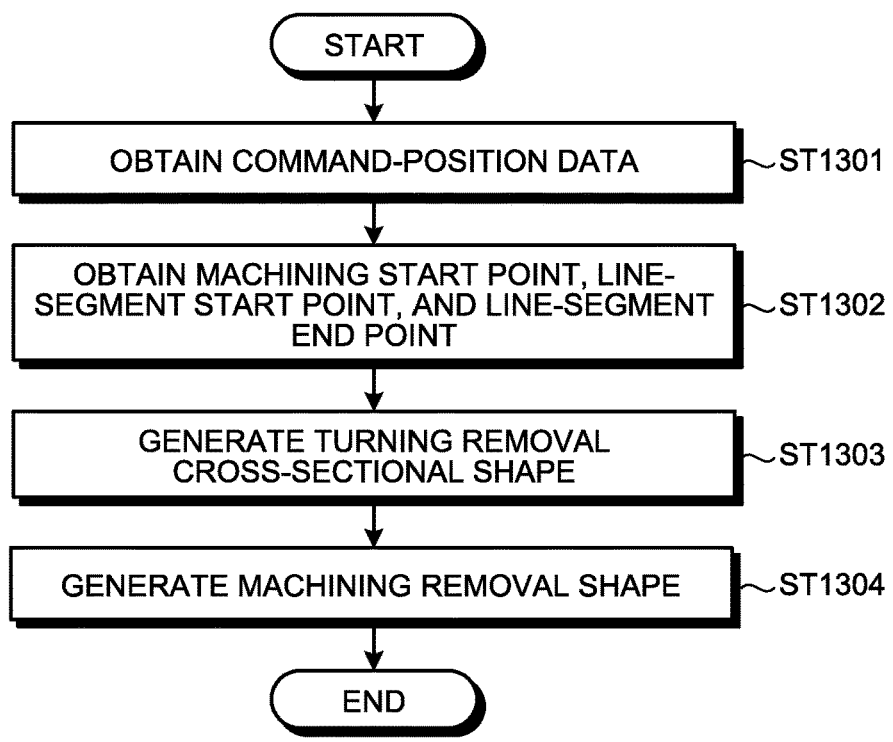
FIG. 7 is a flowchart illustrating a process for generating a machining removal shape of an NC-machining-program block of a fixed turning cycle according to a third embodiment.

FIG. 7 is a flowchart illustrating the process for generating a machining removal shape of the NC-machining-program block of a fixed turning cycle according to the third embodiment. The process is described below.

The present embodiment executes an NC-machining-program block made up of the fixed turning cycle enabling a single block to instruct a shape that is otherwise instructed by several blocks. The NC-machining-program reading unit 101 reads the NC-machining-program block of the fixed turning cycle from the NC machining program 10, and stores the read program block in the NC-machining-program storage unit 102.

First, at Step ST1301, the machining-removal-shape generation unit 111 acquires command-position data of the NC-machining-program block made up of the fixed turning cycle enabling a single block to instruct a shape that is otherwise instructed by several blocks. In the case of an outer-diameter and inner-diameter turning cycle G290 command, the command-position data is obtained from X-command and Z-command values of the NC machining program. The fixed turning cycle enables a single block to instruct a shape that is normally instructed by several blocks in turning work. G290 refers to an outer-diameter and inner-diameter turning cycle. With the machining end point set, the turning is executed to perform continuous cutting from the machining start point in the axial direction of the cylinder.

Next, at Step ST1302, the machining-removal-shape generation unit 111 obtains, from the fixed turning cycle, the position data on the machining start point, and the line-segment start point and line-segment end point that define the machining shape of the fixed turning cycle.

Figure 8:
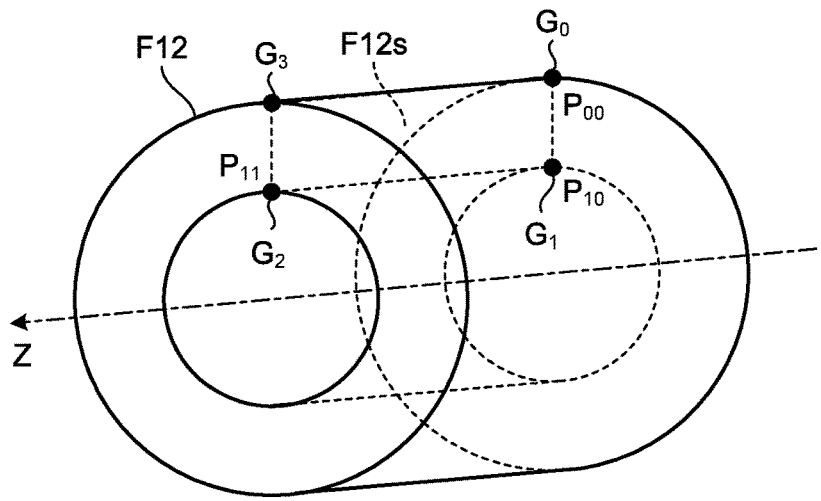
FIG. 8 is a diagram illustrating a machining removal shape of the NC-machining-program block of the fixed turning cycle according to the third embodiment.

Subsequently, at Step ST1303, the machining-removal-shape generation unit 111 generates a turning removal cross-sectional shape from the position data acquired at Step ST1301 and the position data acquired at Step ST1302. From the position data acquired at Step ST1301 and the position data acquired at Step ST1302, as illustrated in FIG. 8, a machining start-point position $G_0$ ($X_0$, $Z_0$) that is an upper right-side point $P_{00}$, and a line-segment start point $G_1$ ($X_1$, $Z_0$) that defines the machining shape of the fixed turning cycle are connected through a straight line, and the line-segment start point $G_1$ ($X_1$, $Z_0$) is further connected to a line-segment end point $G_2$ ($X_1$, $Z_1$) through a straight line. Next, a point $G_3$ ($X_0$, $Z_1$) defined by $X_0$ of the machining start point and $Z_1$ of the line-segment end point is generated, the $G_2$ and $G_3$ are connected to each other through a straight line, and the $G_3$ and $G_0$ are connected to each other through a straight line, thereby generating a rectangle F12s. The above method is an example of the method of generating a turning removal cross-sectional shape.

Next, at Step ST1304, the machining-removal-shape generation unit 111 rotationally sweeps the rectangle F12s of the turning cross-sectional shape generated at Step ST1303, about a turning rotational center axis Z by 360 degrees to generate a swept shape as a machining removal shape F12.

FIG. 8 is a diagram illustrating a machining removal shape of the fixed turning cycle, which is generated through the process in this embodiment. This is the machining removal shape F12 generated by the NC-machining-program block made up of the fixed turning cycle.

Figure 9:
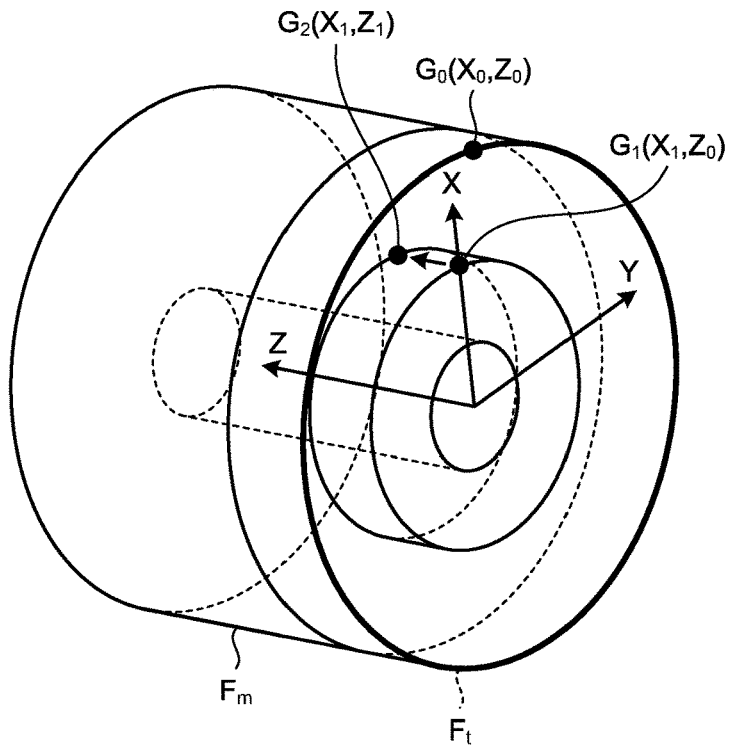
FIG. 9 is a diagram illustrating a machining removal shape and a machining finished shape of the NC-machining-program block of the fixed turning cycle according to the third embodiment.

FIG. 9 is a diagram illustrating a machining finished shape $F_m$ and a machining removal shape $F_t$ of the NC-machining-program block of the fixed turning cycle. The machining removal shape F12 described in FIG. 8 from the material shape corresponds to the machining removal shape $F_t$. The machining removal shape $F_t$ is obtained setting $G_0$ ($X_0$, $Z_0$) that is a machining start point of the tuning step cycle, $G_1$ ($X_1$, $Z_0$) that is a line-segment start point that defines the turning shape, and $G_2$ ($X_1$, $Z_1$) that is a machining end point.

Also in the present embodiment, the machining removal shape and the machining finished shape are generated by the block, from the NC machining program, and the machining finished shape can be confirmed by the block in editing the NC machining program. Accordingly, confirmation of the NC machining program can be made easy and efficient.

Fourth Embodiment

Next, a specific shape when the machining removal shapes of the NC-machining-program blocks explained in the above first to third embodiments is generated sequentially is described as a fourth embodiment. The NC machining device illustrated in FIG. 1 in the first embodiment is used as an NC machining device in the present embodiment. FIGS. 10 to 13 are diagrams illustrating a machining finished shape and a machining removal shape of the NC-machining-program block according to a plurality of data-setting commands in the fourth embodiment.

Figure 10:
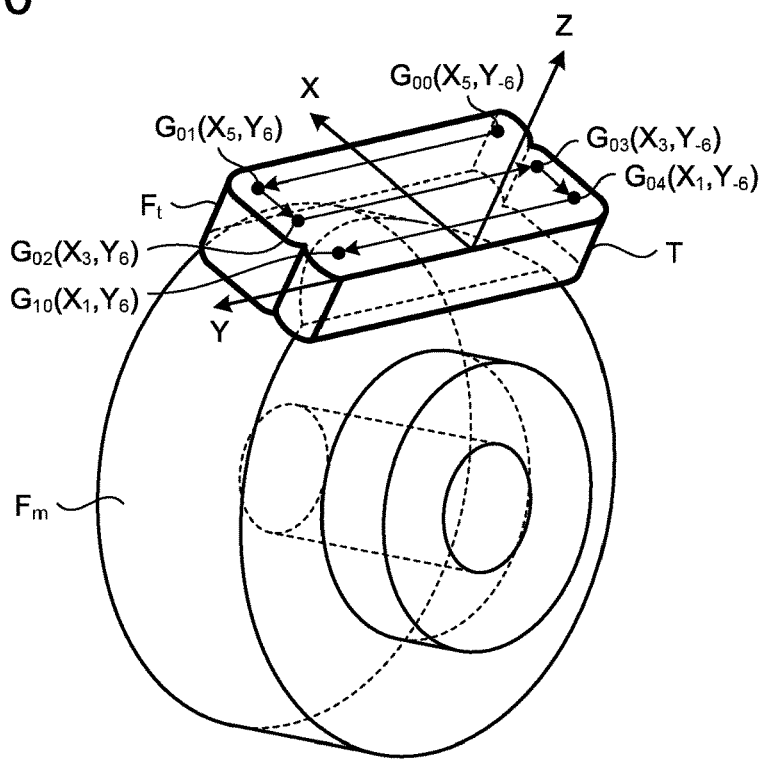
FIG. 10 is a diagram illustrating a machining removal shape and a machining finished shape of an NC-machining-program block according to a plurality of data-setting commands in a fourth embodiment.

Subsequently to FIG. 9 that illustrates the machining removal shape formed by execution of the fixed turning machining program described in the third embodiment, FIG. 10 is a diagram illustrating the machining finished shape $F_m$ and the machining removal shape $F_t$ of the NC-machining-program block according to a plurality of data-setting commands G10. In FIG. 10, the tool shape T is swept from the point $G_{00}$ ($X_5$, $Y_{-6}$) through the point $G_{01}$ ($X_5$, $Y_6$), the point $G_{02}$ ($X_3$, $Y_6$), the point $G_{03}$ ($X_3$, $Y_{-6}$), the point $G_{04}$ ($X_1$, $Y_{-6}$), to the point $G_{10}$ ($X_1$, $Y_6$) in the method in the first embodiment, thereby providing the machining removal shape $F_t$ and the machining finished shape $F_m$.

Figure 11:
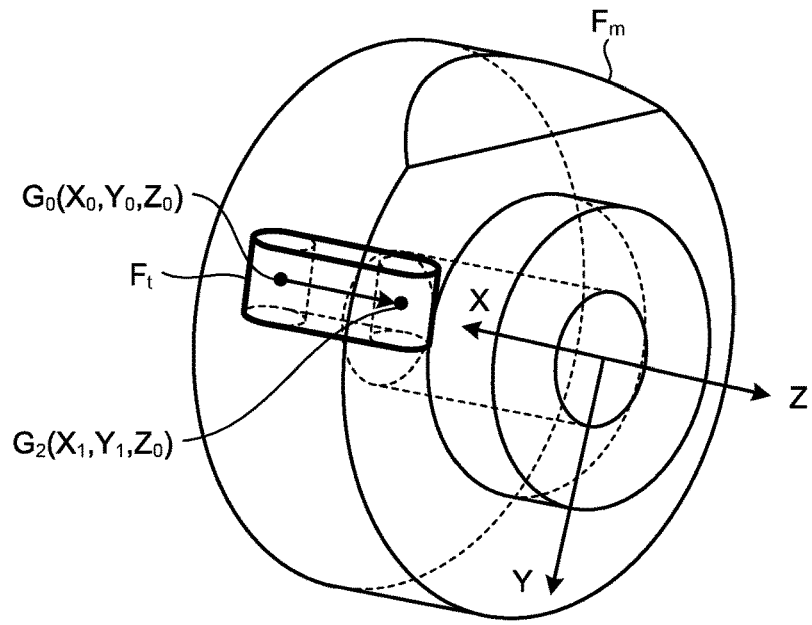
FIG. 11 is a diagram illustrating a machining removal shape and a machining finished shape of an NC-machining-program block according to a plurality of data-setting commands in the fourth embodiment.

Subsequently to FIG. 10, FIG. 11 is a diagram illustrating the machining finished shape $F_m$ and the machining removal shape $F_t$ of the NC-machining-program block when NC machining is performed according to the linear-interpolation command G01. Also in FIG. 11, the tool shape T is swept from the point $G_1$ ($X_0$, $Y_0$, $Z_0$) to the point $G_2$ ($X_1$, $Y_1$, $Z_0$) in the method in the first embodiment, thereby providing the machining removal shape $F_t$ and the machining finished shape $F_m$.

Figure 12:
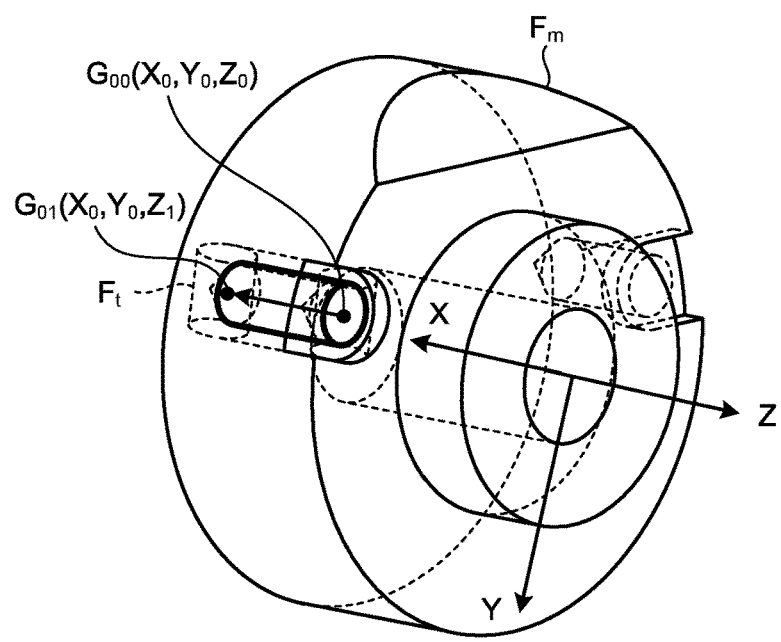
FIG. 12 is a diagram illustrating a machining removal shape and a machining finished shape of an NC-machining-program block according to a plurality of data-setting commands in the fourth embodiment.

Subsequently to FIG. 11, FIG. 12 is a diagram illustrating the machining finished shape $F_m$ and the machining removal shape $F_t$ of the NC-machining-program block of the fixed drilling cycle when the drilling is performed. Also in FIG. 12, the drilling-work tool shape T is swept from the point $G_{00}$ ($X_0$, $Y_0$, $Z_0$) to the point $G_{01}$ ($X_0$, $Y_0$, $Z_1$) in the method in the second embodiment, thereby providing the machining removal shape $F_t$ and the machining finished shape $F_m$.

Figure 13:
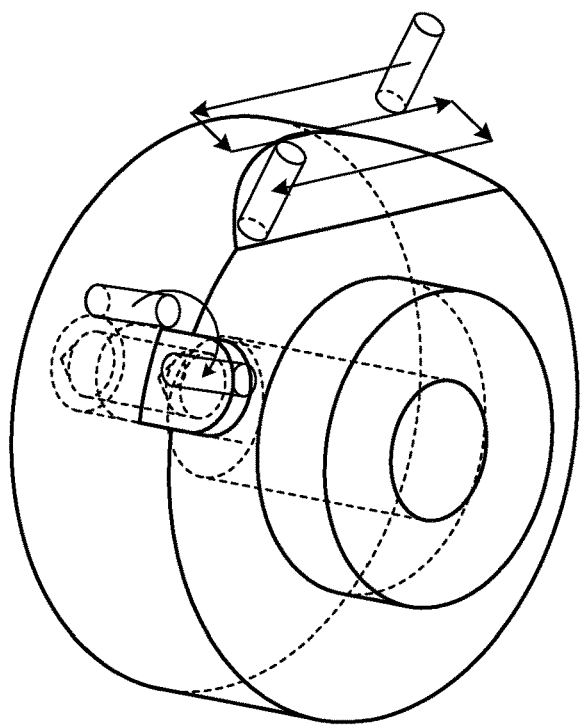
FIG. 13 is a diagram illustrating paths and machining finished shapes, illustrated in FIGS. 10 to 12, of a series of NC-machining-program block.

FIG. 13 illustrates together the paths and machining finished shapes, illustrated in FIGS. 10 to 12, of a series of the NC-machining-program in the fourth embodiment. The machining removal shape $F_t$ and the machining finished shape $F_m$, which are illustrated in FIGS. 10 to 13, are the same as those obtained at the respective machining steps described in the first to third embodiments, and thus the detailed descriptions thereof are omitted.

According to the present embodiment, even when a series of steps is sequentially executed to obtain the machining finished shape, the machining removal shape and the machining finished shape are sequentially generated by the block, from the NC machining program, and the machining finished shape can be confirmed by the block in editing the NC machining program. Accordingly, confirmation of the NC machining program can be made easy and efficient.

Fifth Embodiment

Next, a method of setting a color on a machining removal shape of the NC-machining-program block is described as a fifth embodiment. The NC machining device illustrated in FIG. 1 in the first embodiment is used as an NC machining device in the present embodiment.

Figure 14:
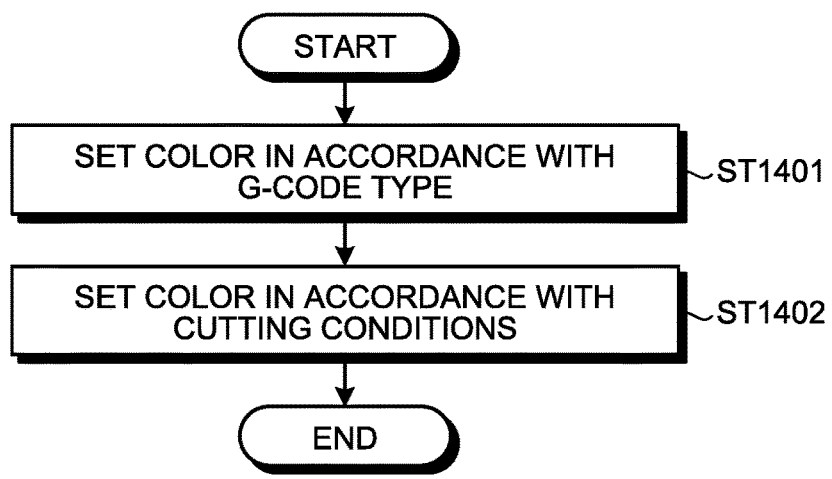
FIG. 14 is a flowchart illustrating a process for setting a color on a machining removal shape in a machining-removal-shape-color setting unit according to a fifth embodiment.

FIG. 14 is a flowchart illustrating the process for setting a color on the machining removal shape in the machining-removal-shape-color setting unit 115 in the numerical control device according to the fifth embodiment. The process is described below.

First, at Step ST1401, the machining-removal-shape-color setting unit 115 sets color information on the machining removal shape, generated by the machining-removal-shape generation unit 111, in accordance with the type of G-code that indicates a command type of the NC-machining-program block.

Examples of the color-information settings are illustrated below.
G0 command RGB (0, 0, 255)
G1 command RGB (32, 32, 255)
G2 command RGB (64, 64, 255)
Fixed drilling cycle command RGB (96, 96, 255)
Fixed turning cycle command RGB (128, 128, 255)

The numerical values in the parenthesis following RGB represent RGB gradation. For example, RGB (0, 0, 0) represents black. RGB (255, 255, 255) represents white. RGB (255, 0, 0) represents red. RGB (0, 255, 0) represents green. RGB (0, 0, 255) represents blue.

Next, at Step ST1402, the machining-removal-shape-color setting unit 115 obtains an F-command (feed rate [mm/rev]) and an S-command (spindle revolution [rpm]), which are prior to the current block, and then obtains data on the tool to be used, which has been searched by the tool-data search unit 112, with respect to the machining removal shape generated by the machining-removal-shape generation unit 111. In accordance with the cutting conditions obtained from the F-command, the S-command and the tool data, RGB color information is obtained to set the color.

For example, the RGB color information is set in terms of the value of feed per tooth=F/(S×the number of teeth in the data on the tool to be used).
Feed per tooth 0.00 to 0.05 RGB (255, 32, 32)
Feed per tooth 0.05 to 0.10 RGB (255, 64, 64)
Feed per tooth 0.10 to 0.15 RGB (255, 96, 96)
Feed per tooth 0.15 to 0.20 RGB (255, 128, 128)

Also in the present embodiment, the machining removal shape and the machining finished shape are generated by the block, from the NC machining program, the machining finished shape and the machining removal shape that are color-coded can be displayed using the display unit 202, by the block in editing the NC machining program. Accordingly, confirmation of the NC machining program can be made easy and efficient.

Further, the numerical control device according to the present embodiment can add the color information on the machining finished shape and the machining removal shape in accordance with the G-code command and the cutting conditions. Therefore, the G-code command or the cutting conditions can be visually confirmed by the depth or brightness of the colors of the surfaces of the machining finished shape and the machining removal shape. Accordingly, a program mistake can be easily recognized.

Sixth Embodiment

Next, a method of generating a machining removal shape of each block of the NC machining program during execution of the program. The NC machining device illustrated in FIG. 1 in the first embodiment is used as an NC machining device in the present embodiment.

Figure 15:
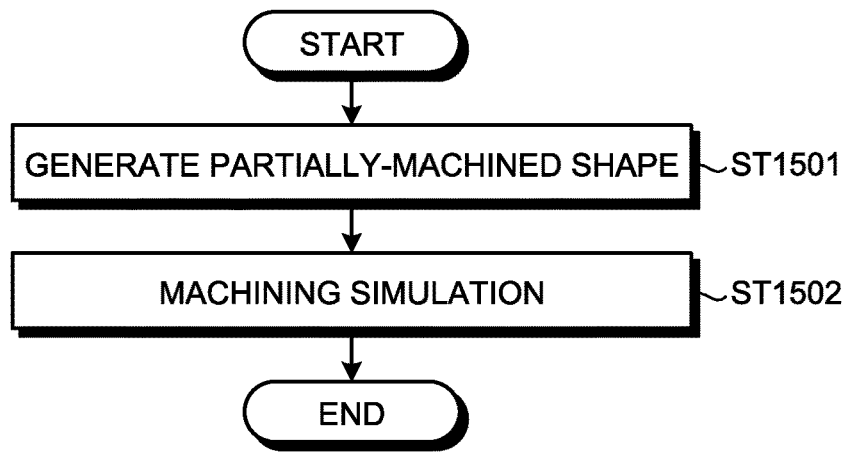
FIG. 15 is a flowchart illustrating a process of a machining simulation process according to a sixth embodiment.

FIG. 15 is a flowchart illustrating the process of the machining simulation in the numerical control device according to the sixth embodiment. The process is described below.

At Step ST1501, the machining-finished-shape generation unit 114 of the 3D-shape processing unit 110 generates a partially-machined shape that is a machining finished shape from the initial block of the NC machining program to a block located immediately before the NC-machining-program block designated by a worker through the interactive-operation processing unit 201 in the machine tool 200.

Next, the machining simulation unit 103 analyzes the NC machining program, generates a servo-interpolation command, and generates an interpolation path from the servo-interpolation command. Subsequently, following a tool-replacement command prior to the current block, the tool-data search unit 112 searches for tool data designated by this tool-replacement command, after which the swept shape obtained by sweeping the tool shape generated from the tool data along the generated interpolation path is removed from the partially-machined shape, thereby performing the machining simulation at Step ST1502.

Next, the machining simulation unit 103 analyzes the NC machining program, generates a servo-interpolation command, and generates an interpolation path from the servo-interpolation command. Subsequently, the tool number designated by the tool-replacement command is extracted to search for tool data corresponding to this tool number, from the tool-data storage unit 120. Next, a tool shape is generated from the searched tool data. Subsequently, at Step ST1502, the swept shape obtained by sweeping the tool shape along the interpolation path is removed from the partially-machined shape to thereby perform the machining simulation.

According to the present embodiment, the machining removal shape and the machining finished shape are generated by the block, from the NC machining program, and the machining finished shape can be confirmed by the block in editing the NC machining program. Accordingly, confirmation of and correction to the NC machining program during the machining process can be made easily and efficient.

Further, the numerical control device according to the present embodiment generates the partially-machined shape by the block, from the NC machining program until the block located immediately before the worker's desired block. From the worker's desired block, the numerical control device switches to the machining simulation according to the servo-interpolation command, and therefore can perform the machining simulation according to a servo-interpolation command, on the blocks subsequent to the worker's desired block. Accordingly, the machining simulation according to the servo-interpolation command conforming to the actual machining time requiring a large amount of calculation can narrow down the location for the interference check, with high accuracy, thereby achieving the efficient confirmation of the NC machining program.

Seventh Embodiment

Next, an interference-check processing method in the numerical control device is described as a seventh embodiment. The NC machining device illustrated in FIG. 1 in the first embodiment is used as an NC machining device in the present embodiment.

Figure 16:
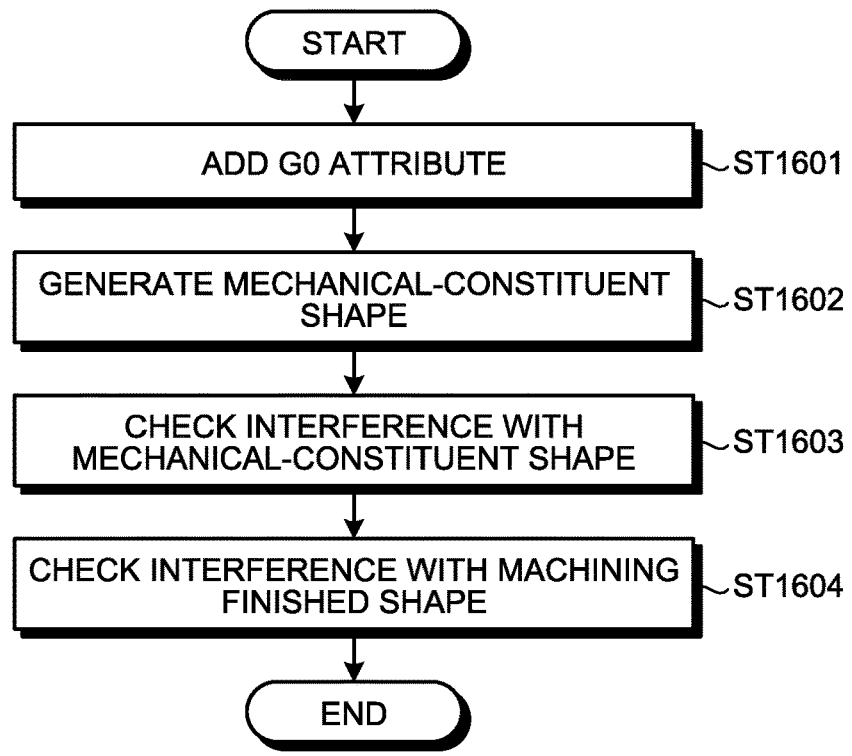
FIG. 16 is a flowchart illustrating an interference-check process according to a seventh embodiment.

FIG. 16 is a flowchart illustrating the interference-check process in the numerical control device according to the seventh embodiment. The process flow is described below.

First, at Step ST1601, when the current block is the positioning command G0, the machining-finished-shape generation unit 114 adds a G0 attribute to the machining removal shape in generating the machining finished shape.

Next, at Step ST1602, the mechanical-constituent-shape generation unit 118 obtains, from the machine tool, information on a chuck, a table and the like that constitute the machine tool, to generate a mechanical-constituent shape.

Subsequently, at Step ST1603, the interference check unit 117 performs the interference check between the mechanical-constituent shape and the machining removal shape having the G0 attribute added. The interference check method performs multiplication operations on the machining removal shape and the mechanical-constituent shape through the 3D-shape processing, and when the shape resulting from the multiplication operations is generated, determines that the interference has occurred. When the shape resulting from the multiplication operations is not generated but the machining removal shape and the mechanical-constituent shape contact each other, it is determined that the interference has occurred.

Next, at Step ST1604, the interference check unit 117 performs the interference check between the machining removal shape having the G0 attribute added, and the machining finished shape generated by the machining-finished-shape generation unit 114 until the block located immediately before the current block.

Instead of performing the machining simulation according to the servo-interpolation command, the numerical control device according to the present embodiment performs the interference check on a machining removal shape of a non-cutting command such as the positioning command G0. Therefore, the numerical control device can perform the interference check on the machining removal shape of the non-cutting command such as the positioning command G0 in a smaller amount of calculation than the machining simulation according to a servo-interpolation command.

Also in the present embodiment, the machining removal shape and the machining finished shape are generated by the block, from the NC machining program, and the interference with the machining finished shape generated by the machining-finished-shape generation unit 114 until the block located immediately before the present block can be checked in editing the NC machining program. Accordingly, confirmation of the NC machining program can be made easy and efficient.

Eighth Embodiment

Next, a method of highlighting the machining removal shape on the machining finished shape in a numerical control device is described as an eighth embodiment. The NC machining device illustrated in FIG. 1 in the first embodiment is used as an NC machining device in the present embodiment.

Figure 17:
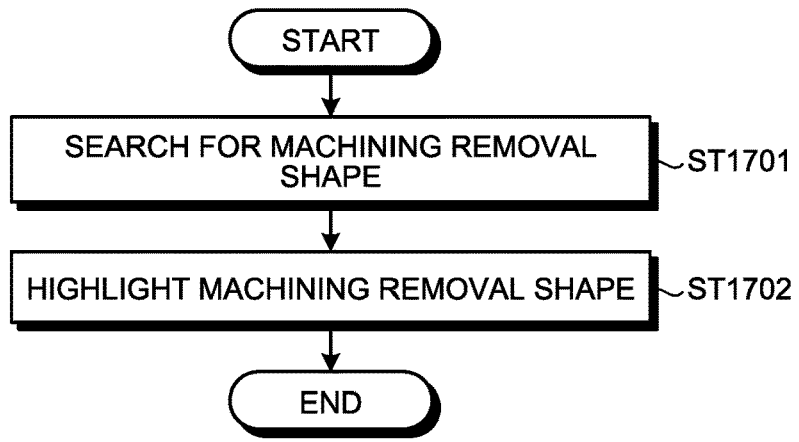
FIG. 17 is a flowchart illustrating a process for highlighting a machining removal shape according to an eighth embodiment.

FIG. 17 is a flowchart illustrating the process for highlighting the machining removal shape on the machining finished shape in the numerical control device according to the eighth embodiment. The process is described below.

First, at Step ST1701, the 3D-shape processing unit 110 searches for a machining removal shape that corresponds to the block of the NC machining program, from the machining-removal-shape storage unit 130. In generating a machining removal shape, the block number of the NC machining program is added to the machining removal shape, thereby enabling searching for the corresponding machining removal shape from the block number of the NC machining program.

Next, at Step ST1702, the machining finished shape and the machining removal shape are both highlighted on the display unit 202 of the machine tool 200. It is preferable to display the machining removal shape semi-transparently after shading display of the machining finished shape.

Figure 18:
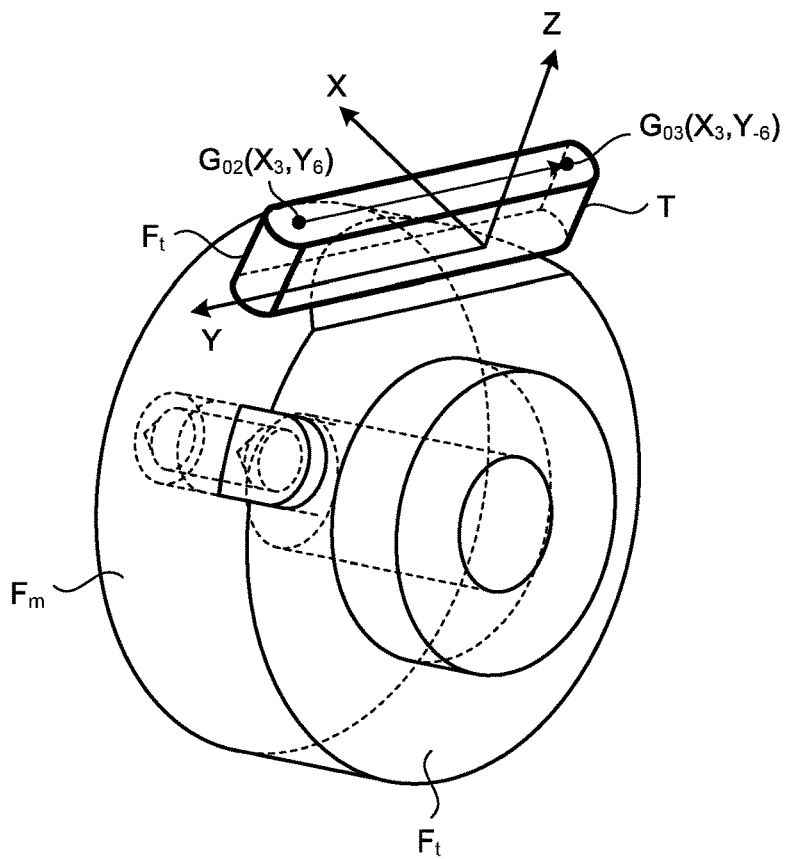
FIG. 18 is a diagram illustrating highlighting of a machining removal shape on a machining finished shape according to the eight embodiment.

FIG. 18 is a diagram illustrating the machining finished shape and the machining removal shape of a specific block of the NC machining program according to the method of the eight embodiment. The diagram of FIG. 18 illustrates the machining finished shape $F_m$ and the machining removal shape $F_t$ of the NC-machining-program block according to a data-setting command. Also in FIG. 18, the tool shape T is swept from the point $G_{02}$ ($X_3$, $Y_6$) to the point $G_{03}$ ($X_3$, $Y_{-6}$), thereby providing the machining removal shape $F_t$ and the machining finished shape $F_m$.

According to the techniques in Patent Literatures 1, 2, and 3 described above, there is no technical concept of generating a machining removal shape on the NC-machining-program block-by-block basis to generate and confirm a machining finished shape. For Patent Literatures 1, 2 and 3, further, it is not possible to confirm the machining finished shape sequentially by the block during the editing of the NC machining program. Furthermore, there is no technical concept of confirming the machining removal shape that corresponds to the block of the NC machining program, and it is not possible to sequentially confirm a section of the machining removal shape of each block of the NC machining program on the machining finished shape.

In contrast to this, the numerical control device according to the present embodiment displays, on the machining finished shape, the machining removal shape that corresponds to the block of the NC machining program, such that a machining section of the block of the NC machining program can be easily recognized. Accordingly, a worker can easily identify the editing section of the NC machining program.

As described above, the numerical control device according to the embodiments of the present invention can generate the machining finished shape by the block. Therefore, while editing the NC machining program, a worker can visually confirm the machining finished shape and the machining removal shape, and can easily recognize a program mistake.

In the above embodiments, the term "block" refers to each line of the NC program. However, it is also possible to form a large block by combining a series of blocks up until a specific G-code command, such as combining a series of blocks up until tool replacement or combining a series of blocks up until a return to the reference point, so as to form a machining finished shape and a machining removal shape by each large block. This enables a worker to edit the NC machining program more efficiently.

The configurations described in the above embodiments are only examples of the contents of the present invention. The configurations can be combined with other well-known techniques, and can be configured while modifying them without departing from the scope of the invention by omitting a part the configurations.

REFERENCE SIGNS LIST

10 NC machining program, 100 numerical control device, 101 NC-machining-program reading unit, 102 NC-machining-program storage unit, 103 machining simulation unit, 110 3D-shape processing unit, 111 machining-removal-shape generation unit, 112 tool-data search unit, 113 material-shape generation unit, 114 machining-finished-shape generation unit, 115 machining-removal-shape-color setting unit, 116 3D-shape display processing unit, 117 interference check unit, 118 mechanical-constituent-shape generation unit, 120 tool-data storage unit, 130 machining-removal-shape storage unit, 200 machine tool, 201 interactive-operation processing unit, 202 display unit, 203 command input unit, G1 command position of previous-block position command, G2 command position of current-block position command, F12, F23 machining removal shape, $F_m$ machining finished shape, $F_t$ machining removal shape.

The invention claimed is:

1. A numerical control (NC) device comprising:
a hardware processor; and
a memory storing instructions which, when executed by the hardware processor, cause the hardware processor to:
generate a machining removal shape of a block, based on an International Standard Organization (ISO)-format or Electronic Industries Alliance (EIA)-format NC machining program and tool data to be used in the NC machining program, the machining removal shape corresponding to a machining section of a finished shape, the block corresponding to a single line of the NC machining program; and
generate a machining finished shape of the block to be displayed on a display unit, on a basis of the machining removal shape generated by the hardware processor,
wherein the instructions further cause the hardware processor to generate a plurality of the machining removal shapes of a plurality of blocks on a block-by-block basis, each of the blocks corresponding to a respective single line of the NC machining program.

2. The numerical control device according to claim 1, wherein the instructions further cause the hardware processor to search for the tool data to be used in the NC machining program.

3. The numerical control device according to claim 1, wherein the instructions further cause the hardware processor to store, in a machining-removal-shape storage, the machining removal shapes of the blocks, call the machining removal shape of each block from the machining-removal-shape storage, and generate the machining finished shape of each block.

4. The numerical control device according to claim 3, wherein the instructions further cause the hardware processor to search for a machining removal shape that corresponds to a block number of the NC machining program, from the machining-removal-shape storage, and highlight the searched machining removal shape.

5. The numerical control device according to claim 1, wherein the instructions further cause the hardware processor to:
generate a material shape from the NC machining program, and
generate the machining finished shape by removing the machining removal shape from the generated material shape.

6. The numerical control device according to claim 1, wherein the instructions further cause the hardware processor to:

set color information on one of the machining removal shapes, in accordance with a command or a cutting condition; and
add to a surface of the machining finished shape the set color information on the machining removal shape.

7. The numerical control device according to claim 1, wherein the instructions further cause the hardware processor to display the machining removal shapes on the display unit.

8. The numerical control device according to claim 1, wherein the instructions further cause the hardware processor to perform a machining simulation on a servo-interpolation command basis by generating a machining swept shape on the servo-interpolation command basis and removing the machining swept shape from the machining finished shape as a partially-machined shape.

9. The numerical control device according to claim 1, wherein the instructions further cause the hardware processor to:
generate a shape of a mechanical constituent component; and
perform an interference check between a shape of the mechanical constituent component and a machining removal shape of a positioning command in one of the machining removal shapes generated by the hardware processor.

10. The numerical control device according to claim 9, wherein the instructions further cause the hardware processor to perform another interference check between the machining removal shape of the positioning command in the machining removal shape generated by the hardware processor, and a machining finished shape generated by the hardware processor until immediately before the other interference check.

11. A numerical control (NC) machining method comprising:
generating a machining removal shape of a block, based on an International Standard Organization (ISO)-format or Electronic Industries Alliance (EIA)-format NC machining program and tool data to be used in the NC machining program, the machining removal shape corresponding to a machining section of a finished shape, the block corresponding to a single line of the NC machining program;
generating a machining finished shape of the block to be displayed on a display unit, on a basis of the generated machining removal shape; and
generating a plurality of the machining removal shapes of a plurality of blocks on a block-by-block basis, each of the blocks corresponding to a respective single line of the NC machining program.

12. The NC machining method according to claim 11, further comprising generating a material shape from the NC machining program, wherein
the generating of the machining finished shape comprises generating the machining finished shape by removing one of the machining removal shapes from the material shape.

13. The NC machining method according to claim 12, further comprising editing one of the blocks of the NC machining program, on a basis of a simulation result and a target machining finished shape.

14. The NC machining method according to claim 11, further comprising:
generating a shape of a mechanical constituent component; and performing an interference check between the shape of the mechanical constituent component and a machining removal shape of a positioning command in the generated machining removal shape.

15. A simulation device comprising:
a hardware processor; and
a memory storing instructions which, when executed by the hardware processor, cause the hardware processor to:
  generate a machining removal shape of a block, based on an International Standard Organization (ISO)-format or Electronic Industries Alliance (EIA)-format numerical control (NC) machining program and tool data to be used in the NC machining program, the machining removal shape corresponding to a machining section of a finished shape, the block corresponding to a single line of the NC machining program;
  generate the machining finished shape of the block, on a basis of the machining removal shape generated by the hardware processor, and generate a machining finished shape of the block to be displayed on a display unit; and
  control the display unit to display the machining finished shape,
wherein the instructions further cause the hardware processor to generate a plurality of the machining removal shapes of a plurality of blocks on a block-by-block basis, each of the blocks corresponding to a respective single line of the NC machining program.

16. The simulation device according to claim 15, wherein the instructions further cause the hardware processor to generate a material shape from the NC machining program, and
generate the machining finished shape by removing one of the machining removal shapes from the material shape.

17. The simulation device according to claim 15, wherein the instructions further cause the hardware processor to display the machining removal shapes on the display unit.

18. The simulation device according to claim 15, wherein the instructions further cause the hardware processor to:
  generate a shape of a mechanical constituent component; and
  perform an interference check between a shape of the mechanical constituent component and a machining removal shape of a positioning command in one of the machining removal shapes generated by the hardware processor.

19. The simulation device according to claim 18, wherein the instructions further cause the hardware processor to perform another interference check between the machining removal shape of the positioning command in the machining removal shape generated by the hardware processor, and a machining finished shape generated by the hardware processor until immediately before the other interference check.

* * * * *